United States Patent
Klenk (10) Patent No.: US 6,770,680 B2
(45) Date of Patent: Aug. 3, 2004

(54) METHOD FOR RECYCLING PET COMPONENTS AND DEVICE FOR CARRYING OUT SAID METHOD

(75) Inventor: Klaus Klenk, Flensburg (DE)

(73) Assignee: Krones AG, Neutraubing (DE)

( * ) Notice: Subject to any disclaimer, the term of this patent is extended or adjusted under 35 U.S.C. 154(b) by 169 days.

(21) Appl. No.: 09/937,388

(22) PCT Filed: Jan. 18, 2001

(86) PCT No.: PCT/EP01/00526

§ 371 (c)(1),
(2), (4) Date: Dec. 20, 2001

(87) PCT Pub. No.: WO01/55250

PCT Pub. Date: Aug. 2, 2001

(65) Prior Publication Data

US 2003/0010360 A1 Jan. 16, 2003

(30) Foreign Application Priority Data

Jan. 24, 2000 (DE) .......................... 100 02 682

(51) Int. Cl.$^7$ ............................................. C08J 11/04
(52) U.S. Cl. ..................... 521/48.5; 528/488; 528/489; 528/503; 425/110
(58) Field of Search .................. 521/48, 48.5; 528/488, 528/489, 499; 425/110

(56) References Cited

U.S. PATENT DOCUMENTS

| | | | | |
|---|---|---|---|---|
| 4,542,239 | A | * 9/1985 | Lamparter et al. | 562/487 |
| 4,602,046 | A | 7/1986 | Buser et al. | |
| 5,580,905 | A | * 12/1996 | Schwartz, Jr. | 521/48 |
| 5,698,378 | A | 12/1997 | Kawamoto | |
| 5,958,987 | A | * 9/1999 | Schwartz et al. | 521/48 |
| 6,147,129 | A | * 11/2000 | Schwartz, Jr. | 521/48.5 |
| 6,376,563 | B2 | * 4/2002 | Robinson et al. | 521/48 |

FOREIGN PATENT DOCUMENTS

| | | |
|---|---|---|
| DE | 1934552 | 7/1968 |
| DE | 2357977 | 11/1973 |
| DE | 4134019 | 10/1991 |
| DE | 19545357 | 12/1995 |
| EP | 304667 | 4/1993 |
| EP | 589642 | 3/1994 |
| JP | 09 174029 | 7/1997 |

\* cited by examiner

*Primary Examiner*—Samuel A. Acquah
(74) *Attorney, Agent, or Firm*—Marshall, Gerstein & Borun LLP (57) ABSTRACT

A process for the recycling of PET flakes from comminuted PET bottles, wherein the flakes are subjected to a washing treatment, are treated for at least 20 minutes in at least one washer at an elevated temperature higher than 70° C. with a cleaning solution which contains caustic soda, and at the same time are also mechanically and hydraulically treated.

41 Claims, 3 Drawing Sheets

METHOD FOR RECYCLING PET COMPONENTS AND DEVICE FOR CARRYING OUT SAID METHOD

FIELD OF THE INVENTION

This invention relates to recycling, and more particularly to a process and an apparatus for recycling of PET constituents from comminuted plastic beverage bottles.

BACKGROUND OF THE INVENTION

In PET washing and treatment installations which are known in practice, PET flakes (ground pieces of plastics, of size about 5 to 10 mm) are treated in washing centrifuges or in stage treatment cleaning devices at high speeds of rotation and under considerable friction, with the addition of relatively small amounts of water. Due to the very high power which is used for a relatively short treatment time, the flakes are subjected to severe mechanical damage, and small pieces together with cracked and split flakes are produced, which can cause problems in further stages of the treatment process. These small pieces have to be removed, which is costly and which reduces the yield. Other disadvantages are that the surface of the flakes are only cleaned unsatisfactorily, namely to a shallow depth, bonding adhesives cannot reliably be removed, and extraneous substances which have diffused into the surface cannot satisfactorily be dissolved out or dissolved away. The extraneous substances can only satisfactorily be removed in further stages of the treatment process, in a different manner which involves significant additional cost.

In a process which is known from EP 0 304 667 A, fine material and paper is separated from the comminuted material in an air classifier, before dust and the like are removed from the flakes, together with the removal of label residues, in a multi-stage fraction washer. Passage through a washing vessel and a suspension vessel is followed by a further separation stage by means of a hydrocyclone arrangement in order to separate what is by far the bulk of the PET-flakes from the remaining fractions. Relatively heavy metal particles which are still present are further treated and are then optionally sorted. This process is extraordinarily costly on an industrial scale, and although it can result in a high degree of separation the final quality of the flakes nevertheless is unsatisfactory.

In a process which is known from U.S. Pat. No. 5,580, 905A for the recycling of plastics waste which contains PET materials amongst others, a slurry is produced using a caustic soda solution without any mechanical washing treatment, and is heated in an environment of low oxygen content to the distillation temperature of the polyols, in order to obtain polyester salts.

In a process which is known from DE 195 45 357A for the re-utilization of comminuted plastics materials, water-washing and sink-float separation, or hydrocyclone separation, are employed. During washing and/or separation, a hydrocarbon-based organic washing medium which has a defined density is used. For example, a mineral oil fraction and/or a raffinate fraction therefrom, optionally with polar solvents can be used.

It is known in principle that PET bottles can be cleaned at an elevated temperature for 20 minutes, using a cleaning solution which contains caustic soda. Sensitivity of PET bottles (stress cracking and shrinkage phenomena), however, means that restricted upper limits have to be adhered to with regards the concentration of the cleaning solution, the treatment temperature, and particularly, with regards the treatment time. These constraints result in a degree of purity which would be too low for the recycling of PET flakes for the production of new bottles.

SUMMARY OF THE INVENTION

The underlying object of the present invention is to provide a process of the type noted at the outset, and an apparatus for carrying out the process, for obtaining flakes of high quality, which can even be used for the manufacture of new bottles from said flakes, can be obtained without costly subsequent processing steps.

A method for recycling of PET constituents from plastic beverage bottles includes comminuting the plastic beverage bottles to form a mixture of particles containing PET flakes. Washing the PET flakes follows, which includes simultaneously treating the PET flakes hydraulically and mechanically in at least one washer with a cleaning solution including caustic soda at a temperature exceeding 70° C. and for more than 20 minutes.

A system for recycling PET flakes from beverage bottles having been comminuted to form a mixture of particles includes a treatment section adapted to treating the mixture including at least one washer. The washer includes a stirrer, at least one float-sink separator, and mechanical and hydraulic treatment devices adapted to treating the PET flakes. A feeder device feeds a cleaning solution including caustic soda to the washer. A heating device heats the cleaning solution including caustic soda.

Because the flakes are treated for more than 20 minutes, at least in the washer, with a cleaning solution which contains caustic soda at an elevated temperature above 70° C., and are thus also processed mechanically and hydraulically at the same time, even the label adhesives which are currently on the market can be removed from the flakes, so that only a low level of subsequent treatment is required, if at all, in order to be able to process the flakes directly. As a result, the surface quality of the flakes is outstanding. The cost of washing the flakes is in fact relatively high, both with regards the process and with regards the apparatus, but this is more than offset by the high final quality and surface quality of the flakes, and the omission of costly additional processing stages constitutes a definite advantage over conventional treatment processes, because particular emphasis is placed on the initial phase of the treatment process.

The apparatus is designed from the outset for an extremely long treatment time, for high treatment temperatures, and for the use of a cleaning solution which contains caustic soda, so as to be able to subject the flakes to mechanical, hydraulic, and intensive thermal treatment.

Particularly satisfactory results are obtained by employing a treatment time of about 30 minutes at 80 to 90° C. Higher temperatures can also be used, however, particularly if reduced pressure is employed.

In order to utilize process technology parameters and knowledge from the cleaning of PET bottles, a treatment time is employed which is prolonged by up to 50 per cent compared with the treatment time which is employed for the cleaning of PET bottles, an elevated treatment temperature is employed compared with the treatment temperature which is possible for the cleaning of PET bottles, and a higher concentration of cleaning solution is also optionally employed.

The surface of the flakes is cleaned very intensively due to the mechanical stirring and to the simultaneous subjection of the flakes to hydraulic high-pressure spraying.

It is advantageous if sieving and/or filtration is effected in the washer, or at least in a subsequent processing stage which is coupled to the washer in the process. Parts of labels, fibres and pieces of foil, as well as particles of dirt, can thereby be separated from the flakes and can be removed from the washing liquor.

At least one additive can be added to the cleaning solution in order to intensify the cleaning effect.

Due to the further treatment of the flakes in a sink-float separator with the cleaning solution which contains caustic soda, the surface quality of the flakes which is achieved using a long treatment time is so good that the flakes require no appreciable further processing.

Due to the subsequent intensive washing in an intensive washer, likewise with the use of the cleaning solution which contains caustic soda, even tenacious iridescent stains and coatings are reliably removed.

The treatment in the sink-float separator or in the intensive washer is advantageously carried out with recirculation or partial recirculation, in order to achieve a sufficiently long treatment time and an increased throughput with a more intensive cleaning effect.

Following the intensive washing stage, the cleaning solution which contains caustic soda is separated and recycled, so that the cleaning solution can be reused repeatedly with relatively small losses.

In this respect, it is advantageous if the concentration of the cleaning solution is continuously monitored and is adjusted by metered additions of at least a caustic soda solution.

The elevated treatment temperature is advantageously achieved by heating the washer.

The washer advantageously contains sieve plates and automatic filters in order to detach and reject label constituents, fibres, pieces of foil and particles of dirt.

In order to maintain a treatment temperature between about 80 and 90° C., even under conditions of high throughput or when the washer is of large capacity, it is advantageous if at least one heat exchanger and/or a direct heater device is provided in the heater device, wherein the temperature can be adjusted and maintained in a particularly sensitive manner by employing an electro-pneumatic control system.

The use of a high-pressure pump and nozzle pipes results in the high-pressure cleaning of the entire surface of the flakes. The sieve plates, filters and nozzle pipes are advantageously fixedly disposed in relation to a plurality of stirrer stages, so that the mixture in the washer is also uniformly and intensively agitated.

Due to the coupling of the sink/float separator to the washer in the process, the hot cleaning solution which contains caustic soda is also used in the separator.

In a downstream intensive washer through which the flakes and a partial stream of the cleaning solution are conveyed, e.g. by a pump, an additional surface cleaning effect is ensured in which even tenacious iridescent stains and coatings are reliably removed. A recycle section can be provided between the intensive washer and the sink-float separator, in order to create at least partial recirculation and to achieve the requisite hold-up time at high throughputs without employing vessels of extremely large volume.

Following the intensive washer, the cleaning solution which contains caustic soda is separated in a separator and is recycled to the preceding process stages. For this purpose, a supply branch can be provided which leads to the washer and which advantageously comprises at least one supply pump.

At least one caustic soda measuring and metering unit should be present in the feeder device. This measuring and metering unit is connected to the supply branch or is connected thereto in some situations, but can optionally also be connected to the sink-float separator so as to be able to adjust the concentration in the sink-float separator or even to make individual adjustments therein.

So as not to adversely affect the treatment temperature, particularly in the washer, during the feeding of caustic soda and/or additives, a preheater device should be provided in the metering unit.

After the cleaning solution has been separated, it is advantageously passed through a neutralizer which is supplied with fresh water and with an acid, e.g. phosphoric acid or $CO_2$, with corresponding metering, and the PET material is neutralized. Rinsing with fresh water can even be carried out here for cleaning purposes.

The sink-float separator is advantageously also supplied with fresh water, in order to deliberately set a concentration which is different from that in the washer, or specifically to compensate for losses.

In order to separate at least part of the heavy material which may be contained in the mixture, a heavy material separator should be disposed upstream of the washer.

The washer is advantageously designed with an uptake and throughput capacity for a treatment time of more than 20 minutes, preferably about 30 minutes.

BRIEF DESCRIPTION OF THE DRAWINGS

The disclosed process and treatment apparatus, are described with reference to the drawings below, where.

DETAILED DESCRIPTION OF THE INVENTION

Figure 1A:
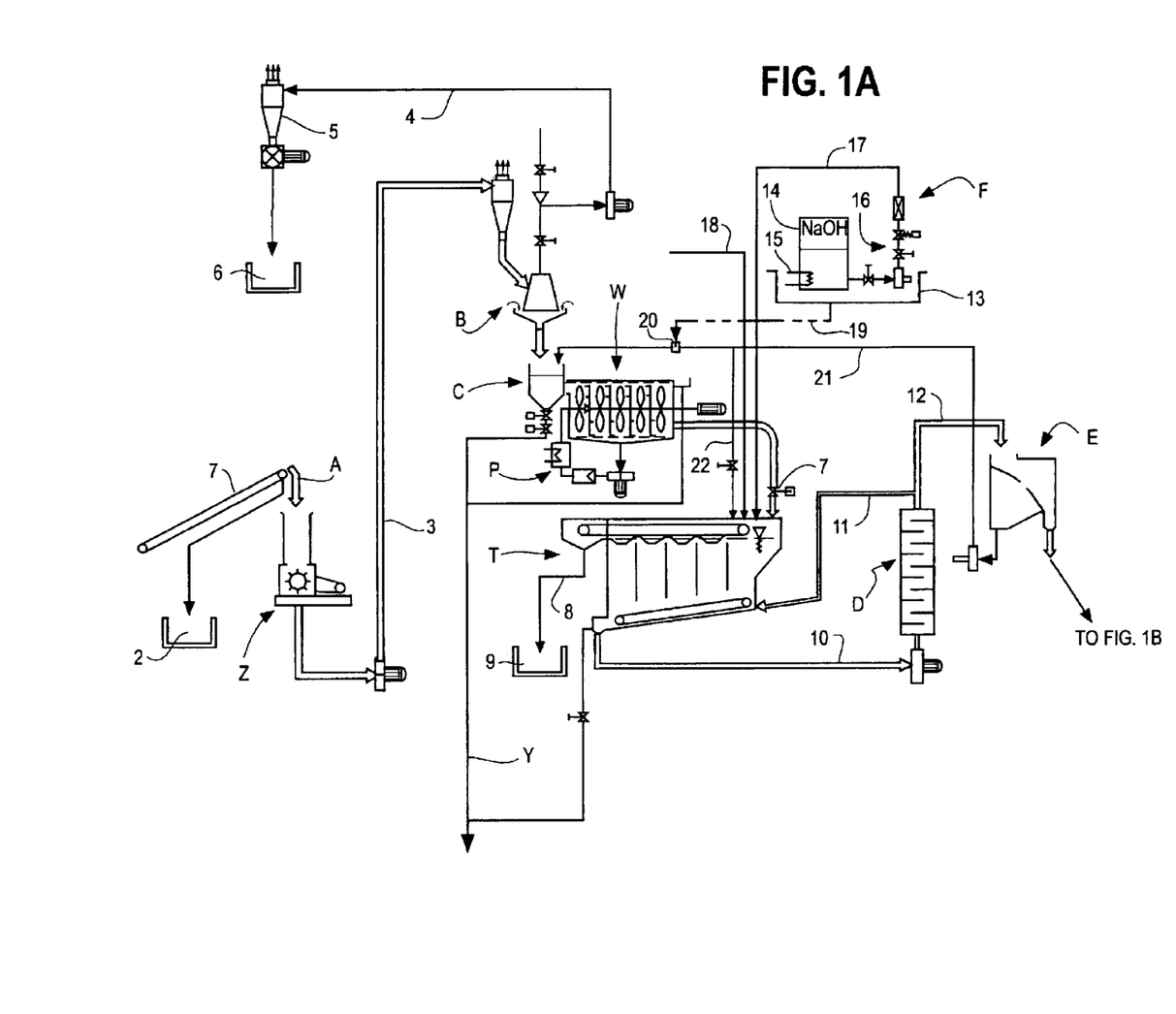
FIGS. 1A and 1B viewed jointly, represent a block flow diagram of an apparatus for the treatment of PET flakes.
Figure 1B:
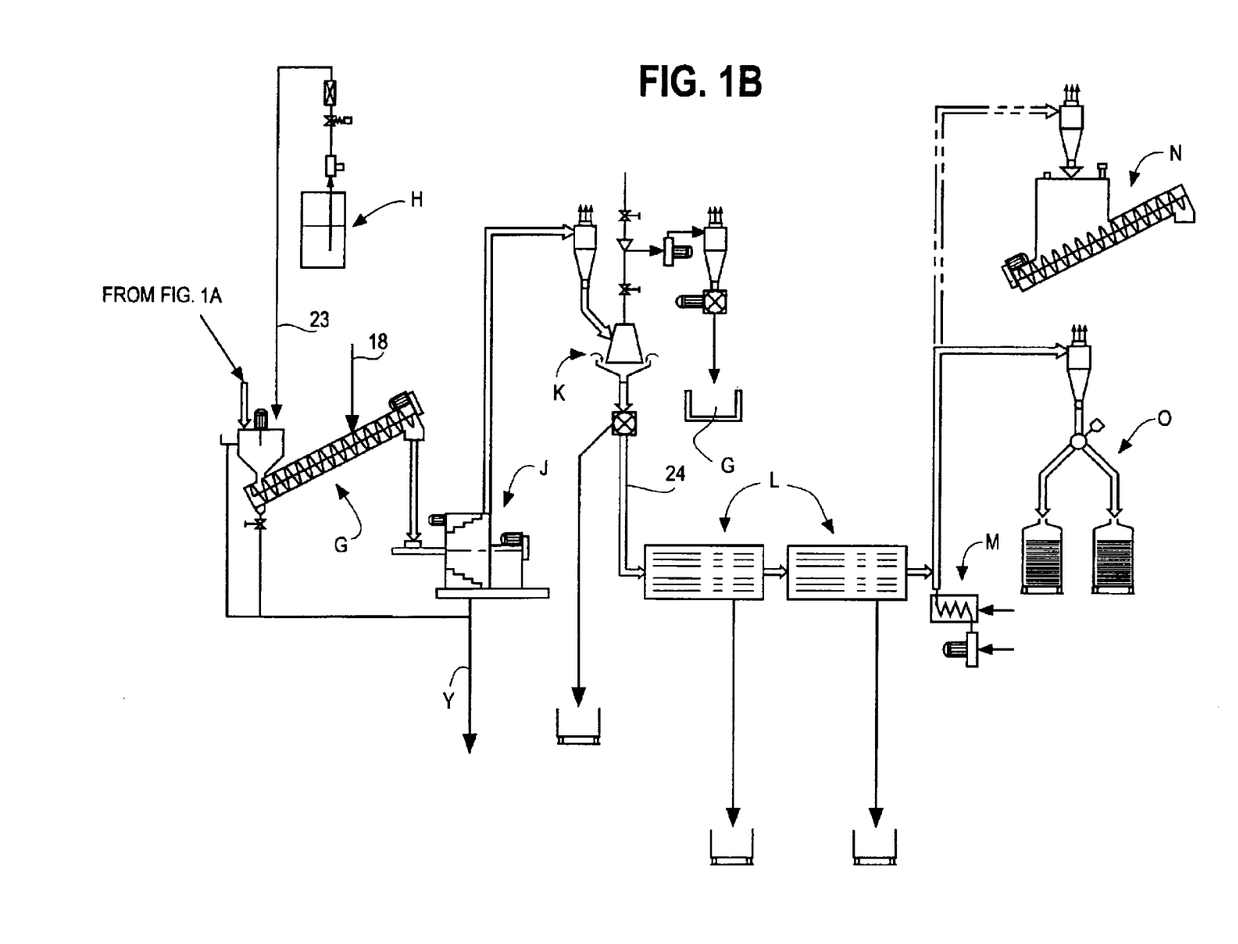

Referring to FIGS. 1A and 1B, a recycling apparatus or installation for carrying out a treatment process for conditioning at least PET constituents of plastics beverage bottles, includes a multiplicity of stations which are explained below in relation to the successive process steps.

Referring to FIG. 1A, the beverage bottles are conveyed in stream A via a conveyor belt 1 with an associated metal separator 2 into a cutter mill Z, which can be a dry or wet mill, and are ground or comminuted. The mixture of particles is fed via a conveying device 3 such as a suction and conveying device, to an air classifier unit B, from which, via a branch line 4 and an auxiliary device 5, classified fractions, particularly light components such as a label constituents, foil constituents and the like (up to about 80 per cent thereof) and loose particles of dirt, dust and the like, are separated from PET constituents. From the air classifier unit B, the PET constituents (i.e., flakes) are fed to a heavy material trap C which is associated with a washer W. Pieces of metal, glass, stone and the like are separated in the heavy material trap C. The flakes are mixed in the heavy material trap C with a cleaning solution from a supply branch 21, wherein the cleaning solution contains caustic soda and optionally contains suitable additives. In the heavy material trap C, the cleaning solution is already at an elevated temperature, e.g., between 80 and 90° C. Thereafter, the mixture flows through the washer W for more than 20 minutes, preferably about 30 minutes. Downstream of the washer W, a float/sink separator T is provided, the feed to which can be adjusted via a shut-off element. In the float/sink separator T, floating components such as bottle cap constituents, labels, fibres, foil constituents and the like are removed from the PET flakes, as are PP and PVC components which are collected at collection point 9 via a branch line 8. From the float/sink separator, the PET flakes, together with the cleaning solution, are fed via a branch 10 into at least one intensive washer D, from which they are fed via a branch 12 into a liquid separator E. A bypass 11 is provided between the branch 12 and a lower inlet of the float/sink separator T, in order to create a recirculation or partial recirculation between the float/sink separator T and the intensive washer D, if desired. In the liquid separator E, the cleaning solution is separated from the flakes and is recycled via the supply branch 21 to the washer W or the heavy material trap C. From the liquid separator E, the PET flakes are fed to a neutralizer G.

A caustic soda measuring and metering unit F is associated with the washer W and with the float/sink separator T. This measuring and metering unit F may include, for example, a caustic soda container 14 with a heater device 15 in a collecting vessel 13, for example, wherein the collecting vessel 13 is connected to the supply branch 21 via a connection line 19 and a mixing device or overflow 20. Unit F is completed by a plurality of shut-off elements, and optionally by a filter and a supply pump in a metering sub-assembly 16, which is connected directly to the float/sink separator T via a line 17. A fresh water line 18, and a branch line 22 which comprises a shut-off element, lead from the supply branch 21 to the float/sink separator T (the description of FIG. 2 provides further explanations of the detailed construction of the washer W and of the float/sink separating device).

Referring to FIG. 1B, the neutralizer G, which is constructed as an ascending conveyor with an internal stirrer and a feed hopper fitted with a stirrer and a waste water overflow, is connected to the fresh water feed 18 and at the same time is connected via a line 23 to a measuring and metering station H, in which pH measurements can be made and additions of a neutralising acid (e.g., phosphoric acid or $CO_2$) can be adjusted. The neutralizer G is followed by a mechanical dryer J, downstream of which at least one further air classifier unit K is disposed, from which a classified fraction is separated via auxiliary devices 5. Pieces of metal and small pieces of PET are separated from the stream of flakes in a downstream metal separator in a branch 24. Following this, a plurality of sorters L is provided for sorting and rejecting coloured PET constituents and PP constituents, before subsequent thermal drying of the clear PET flakes is effected, for example by an indirect gas burner, for example, in an after-dryer M. Following this, the conditioned PET flakes are either temporarily stored in a silo N or are packed in a packing station O. If waste water is formed during the process, or in order to stop the apparatus, waste water lines Y are provided for this purpose.

Figure 2:
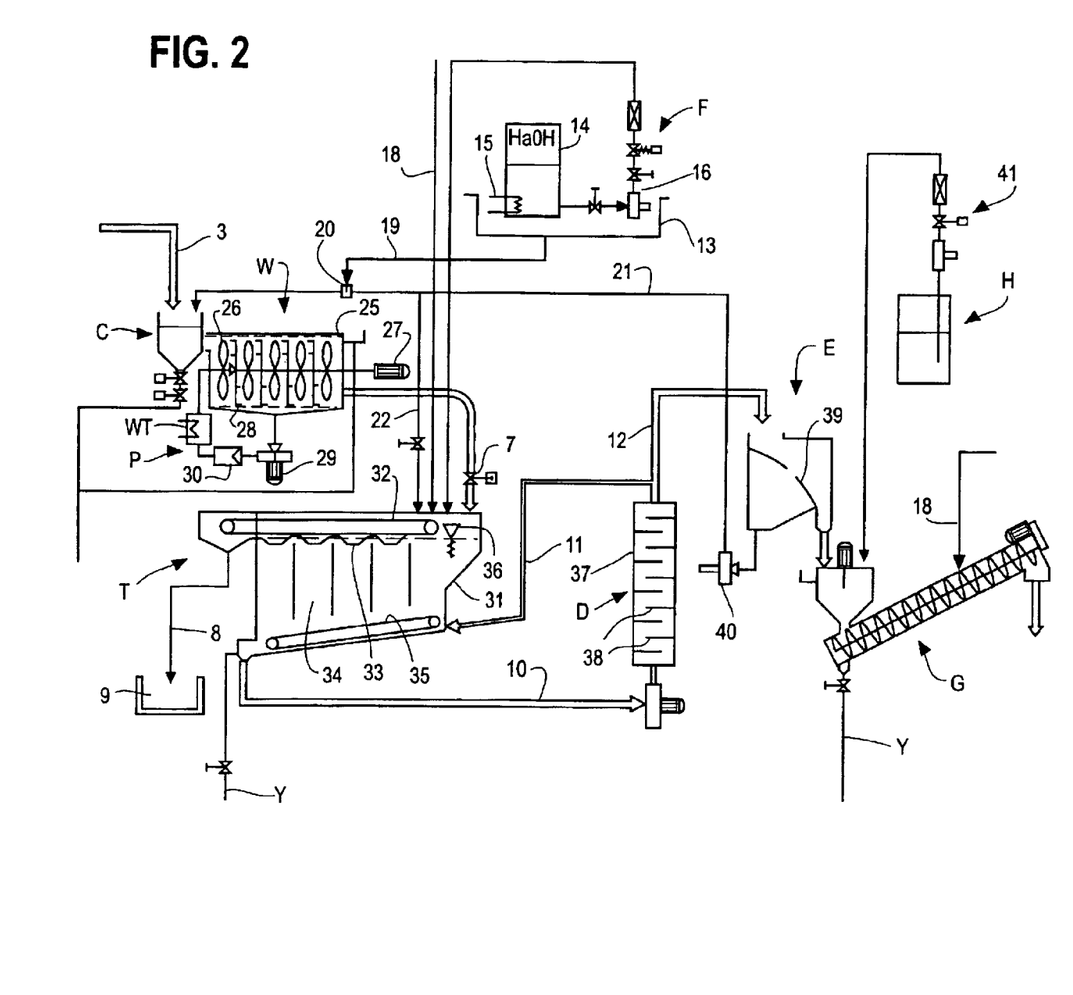
FIG. 2 shows an enlarged portion of the apparatus of FIG. 1.

As shown in FIG. 2, the washer W comprises a vessel 25 in which a plurality of stirrer stages 26, which have a horizontal stirrer shaft, for example, and which are fitted with blades, are accommodated spaced apart from each other and are driven by a stirrer motor 27. Fixed nozzle pipes 28 are mounted between the stirrer stages 26, and are supplied with the cleaning solution from a high-pressure pump 29 via a filter 30 and a heat exchanger WT of a heater device EP. Sieve plates (not shown) and automatic filter devices (not shown) can be provided in the vessel 25, in order to purify the cleaning solution as it is fed to the high-pressure pump 29. A defined treatment temperature is set and maintained in the washer by means of the heat exchanger WT, wherein the temperature ranges between about 80 and 90° C. A uniform treatment temperature can be obtained, for example, by employing an electro-pneumatic temperature control system. A direct heater (not shown) could be provided in the vessel 25 instead of the heat exchanger WT.

In the washer W, the flakes and any pieces of plastics which remain are intensively treated mechanically and hydraulically by the stirrer stages 26 and by a high pressure spray from the nozzle pipes 28. The treatment time is about 30 minutes. In the course of this procedure, the entire surfaces of the flakes is intensively cleaned.

In the subsequent sink-float separator T, floating pieces are removed. Since the sink-float separator T is connected in the process to the washer W, a hot cleaning solution which contains caustic soda is also employed therein. At the long treatment time employed, which is preferably about 30 minutes, an extraordinarily good surface quality, for the flakes is achieved, so that only a slight subsequent processing is necessary, if any. An intensive separation of adhesives also occurs in the sink-float separator, wherein separation in the cleaning solution is facilitated by the different specific gravities of water and caustic soda solution.

The sink-float separator T, which includes a vessel 31 of large volume, may contain conveyor belts and separator belts 32, 33, separating sections 34, and an inclined conveyor belt 35. A level controller 36 for the level in the sink-float separator T should also be provided. In the downstream intensive washer D, which is constructed with a housing 37 resembling an upright column with an ascending meander-shaped conveyor part comprising separating sections 38, additional surface cleaning of the PET flakes is ensured in order reliably to remove, for example, tenacious iridescent stains and coatings. At least a partial stream is optionally recycled via the bypass 11, in order to make repeated use of the separator T and of the intensive washer D, for example. The downstream liquid separator E may contain sieve plates 39, for example, which allow the PET flakes to pass to the inlet of the neutralizer G but which separate the cleaning solution, which is recycled to the heavy material trap C by a supply pump 40 and supply branch 21.

The measuring and metering unit H of the neutralizer G comprises appropriate measuring devices, shut-off elements and filter groups 41, in order to feed in phosphoric acid and/or $CO_2$ depending on the measured pH. The PET flakes are neutralized in the neutralizer G with the addition of acid or of $CO_2$ and are finally rinsed clean with fresh water in a plurality of stages.

In the metering unit F, a defined concentration of caustic soda in the cleaning solution is set. It is considered it to be advantageous if the corresponding dose is added to the float/sink separator T, although direct metering into the washer W could also be effected.

A treatment time of 20 minutes, using a cleaning solution containing caustic soda has proven to be necessary for the cleaning of PET bottles, in order to remove the bulk of the flavouring substances and contaminant substances which are forced into the surface. During the cleaning of PET bottles, however, the treatment time and treatment temperature are subject to an upper limit, because stress cracking and the shrinkage of the material must be avoided. This also restricts the permissible concentration of the cleaning solution, so that during the cleaning of PET bottles the label adhesives which are currently on the market cannot be removed from the PET material. Basic knowledge from the cleaning of PET bottles is, however, used in the process according to the disclosed method and apparatus for the recycling of PET flakes, wherein defined process parameters are increased considerably with regards a defined final quality of the PET flakes compared with the purity which can be achieved for the cleaning of PET bottles.

I claim:

1. A method for recycling of PET constituents from plastic material including at least plastic beverage bottles comprising the steps of:
comminuting said plastic beverage bottles to form a mixture of particles containing PET flakes; and
washing the PET flakes, said washing comprising simultaneously treating the PET flakes hydraulically and mechanically in at least one washer with a cleaning solution including caustic soda at a temperature of about 75 to 95° C. and for about 20 to 40 minutes.

2. A method for recycling of PET constituents from plastic material including at least plastic beverage bottles comprising the steps of:
comminuting said plastic beverage bottles to form a mixture of particles containing PET flakes; and
washing the PET flakes, said washing comprising simultaneously treating the PET flakes hydraulically and mechanically in at least one washer with a cleaning solution including caustic soda at a temperature exceeding 70° C. and for about 30 minutes.

3. A method for recycling of PET constituents from plastic material including at least plastic beverage bottles comprising the steps of:
comminuting said plastic beverage bottles to form a mixture of particles containing PET flakes; and
washing the PET flakes, said washing comprising simultaneously treating the PET flakes hydraulically and mechanically in at least one washer with a cleaning solution including caustic soda at a temperature of about 80 to 90° C. and for more than 20 minutes.

4. A method for recycling of PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes; and
using filtration in said washer.

5. A method for recycling according to claim 4, further comprising using sieving in said washer.

6. A method for recycling of PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes; and
using sieving in said washer.

7. A method for recycling of PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes; and
using filtration following said washer.

8. A method for recycling according to claim 7, further comprising using sieving following said washer.

9. A method for recycling of PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes; and
using sieving following said washer.

10. A method for recycling PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes;
treating the PET flakes in at least one sink-float separator in the cleaning solution including caustic soda, wherein paid treating is subsequent to said washing; and
separating said cleaning solution including caustic soda from the PET flakes subsequent to said intensively washing, and recycling said cleaning solution including caustic soda.

11. A method for recycling of PET constituents from plastic material including at least plastic beverage bottles comprising the steps of:
comminuting said plastic beverage bottles to form a mixture of particles containing PET flakes;
washing the PET flakes, said washing comprising simultaneously treating the PET flakes hydraulically and mechanically in at least one washer with a cleaning solution including caustic soda at a temperature exceeding 70° C. and for more than 20 minutes; and
continuously monitoring the concentration of said cleaning solution including caustic soda, and adjusting said concentration by measured additions to said cleaning solution including caustic soda.

12. A system for recycling PET flakes from plastic beverage bottles having been comminuted to form a mixture of particles comprising:
a treatment section adapted to treating said mixture including at least one washer and at least one sink-float separator, wherein said washer comprises:
a stirrer;
sieve plates and automatic filters;
mechanical and hydraulic treatment devices adapted to treating the PET flakes.

13. A system for recycling in accordance with claim 12, wherein said hydraulic treatment devices of said washer further comprise nozzle pipes being connected to at least one pump.

14. A system for recycling in accordance with claim 13, said stirrer having a plurality of stirrer stages, wherein said sieve plates, said filters and said nozzle pipes are fixedly disposed in relation to said plurality of stirrer stages.

15. A system for recycling in accordance with claim 13, wherein said pump is a high pressure pump.

16. A system for recycling PET flakes from plastic beverage bottles having been comminuted to form a mixture of particles comprising:
a treatment section adapted to treating said mixture including at least one washer, at least one sink-float separator, said sieve plates and automatic filters subsequent said washer, wherein said washer comprises:
a stirrer;
mechanical and hydraulic treatment devices adapted to treating the PET flakes.

17. A system for recycling in accordance with claim 16, wherein said hydraulic treatment devices of said washer further comprise a plurality of nozzle pipes being connected to at least one pump.

18. A system for recycling in accordance with claim 17, said stirrer having a plurality of stirrer stages, wherein said sieve plates, said filters and said nozzle pipes are fixedly disposed in relation to said plurality of stirrer stages.

19. A system for recycling in accordance with claim 17, wherein said pump is a high pressure pump.

20. A system for recycling PET flakes from plastic beverage bottles having been comminuted to form a mixture of particles comprising:
a treatment section adapted to treating said mixture including at least one washer and at least one sink-float separator coupled to said washer and operated with said cleaning solution including caustic soda being at an elevated temperature, wherein said washer comprises:
a stirrer;
mechanical and hydraulic treatment devices adapted to treating the PET flakes.

21. A system for recycling PET flakes from plastic beverage bottles having been comminuted to form a mixture of particles comprising:
a treatment section adapted to treating said mixture including at least one washer, at least one sink-float separator, and at least one intensive washer disposed downstream of said sink-float separator, wherein said washer comprises:
a stirrer:
mechanical and hydraulic treatment devices adapted to treating the PET flakes.

22. A system for recycling in accordance with claim 21, further comprising a bypass between said sink-float separator and said intensive washer, wherein said bypass provides a hold-up circuit simultaneously in said sink-float separator and in said intensive washer.

23. A system for recycling in accordance with claim 21, further comprising a separator for said cleaning solution including caustic soda, wherein said separator is disposed downstream of said intensive washer.

24. A system for recycling in accordance with claim 23, further comprising a neutralizer disposed downstream of said separator, wherein said neutralizer is connected to a fresh water supply and to an acid measuring station.

25. A system for recycling in accordance with claim 23, further comprising a neutralizer disposed downstream of said separator, wherein said neutralizer is connected to a fresh water supply and to a CO2 measuring station.

26. A system for recycling PET flakes from plastic beverage bottles having been comminuted to form a mixture of particles comprising:
a treatment section adapted to treating said mixture including at least one washer, at least one sink-float separator, and a feeder device comprising a supply branch provided at least from said separator to said washer, wherein said washer comprises:
a stirrer;
mechanical and hydraulic treatment devices adapted to treating the PET flakes.

27. A system for recycling in accordance with claim 26, wherein said supply branch comprises a supply pump.

28. A system for recycling in accordance with claim 26, said feeder device further comprising a measuring and metering unit connected at least to said supply branch.

29. A system for recycling in accordance with claim 28, wherein said feeder device is also connected to said sink-float separator.

30. A system for recycling in accordance with claim 28, said measuring and metering unit having a pre-heater device.

31. A system for recycling PET flakes from plastic beverage bottles having been comminuted to form a mixture of particles comprising:
a treatment section adapted to treating said mixture including at least one washer and at least one sink-float separator connected to a fresh water supply, wherein said washer comprises:
a stirrer;
mechanical and hydraulic treatment devices adapted to treating the PET flakes.

32. A system for recycling PET flakes from plastic beverage bottles having been comminuted to form a mixture of particles comprising:
a treatment section adapted to treating said mixture including at least one washer, at least one sink-float separator, and a heavy material separator disposed upstream of said washer, wherein said washer comprises:
a stirrer;
mechanical and hydraulic treatment devices adapted to treating the PET flakes.

33. A system for recycling PET flakes from plastic beverage bottles having been comminuted to form a mixture of particles comprising:
a treatment section adapted to treating said mixture including at least one washer, at least one sink-float separator, and a metal separator disposed downstream of said washer, wherein said washer comprises:
a stirrer;
mechanical and hydraulic treatment devices adapted to treating the PET flakes.

34. A system for recycling PET flakes from plastic beverage bottles having been comminuted to form a mixture of particles comprising:
a treatment section adapted to treating said mixture including at least one washer adapted to provide uptake and throughput capacity for a treatment time of more than about 20 minutes and at least one sink-float separator, wherein said washer comprises:
a stirrer;
mechanical and hydraulic treatment devices adapted to treating the PET flakes.

35. A system for recycling in accordance with claim 34, wherein said treatment time is about 30 minutes.

36. A system for recycling PET flakes from plastic beverage bottles having been comminuted to form a mixture of particles comprising:
a treatment section adapted to treating said mixture including a heating device, at least one washer and at least one sink-float separator, wherein said washer comprises:
a stirrer;
mechanical and hydraulic treatment devices adapted to treating the PET flakes.

37. A system for recycling in accordance with claim 36, wherein said heating device comprises at least one heat exchanger.

38. A system for recycling in accordance with claim 36, wherein said heating device comprises at least one direct heater.

39. A system for recycling in accordance with claim 36, wherein said heating device comprises at least one direct heater.

40. A system for recycling in accordance with claim 36, wherein said heating device comprises electro-pneumatic control for maintaining a treatment temperature in said washer in the range of about 70 to 95° C.

41. A system for recycling in accordance with claim 40, wherein said treatment temperature is in the range of 80 to 90° C.

* * * * *

UNITED STATES PATENT AND TRADEMARK OFFICE
CERTIFICATE OF CORRECTION

PATENT NO.         : 6,770,680 B2                                   Page 1 of 1
APPLICATION NO. : 09/937388
DATED              : August 3, 2004
INVENTOR(S)        : Klaus Klenk It is certified that error appears in the above-identified patent and that said Letters Patent is hereby corrected as shown below:

On the Cover Page:

At Section 73 (Assignee), the correct spelling of Assignee's location in Germany is --Neutraubling--.

In the Claims:

In Claim 45, line 9, delete "paid" and replace with --said--.

Signed and Sealed this

Eighteenth Day of September, 2007

JON W. DUDAS
*Director of the United States Patent and Trademark Office*